(12) United States Patent
Kulakovskij (10) Patent No.: US 11,420,145 B2
(45) Date of Patent: Aug. 23, 2022

(54) TUBULAR FILTER AND SYSTEM FOR FILTRATION OF POLLUTED AMBIENT AIR

(71) Applicant: Kirill Kulakovskij, Karlovy Vary (CZ)

(72) Inventor: Kirill Kulakovskij, Karlovy Vary (CZ)

( * ) Notice: Subject to any disclaimer, the term of this patent is extended or adjusted under 35 U.S.C. 154(b) by 0 days.

(21) Appl. No.: 17/113,182

(22) Filed: Dec. 7, 2020

(65) Prior Publication Data
US 2021/0346828 A1    Nov. 11, 2021

(30) Foreign Application Priority Data

May 6, 2020 (WO) .................. PCT/IB2020/000396
Oct. 8, 2020 (WO) .................. PCT/IB2020/059448

(51) Int. Cl.
*B01D 46/00* (2022.01)
*B01D 45/16* (2006.01)
*A62B 23/02* (2006.01)
*B04C 11/00* (2006.01)

(52) U.S. Cl.
CPC ............ *B01D 45/16* (2013.01); *A62B 23/02* (2013.01); *B04C 11/00* (2013.01); *B01D 2259/4541* (2013.01)

(58) Field of Classification Search
CPC ............ B01D 45/16; B01D 2259/4541; A62B 23/02; B04C 11/00
See application file for complete search history.

(56) References Cited

U.S. PATENT DOCUMENTS

| 1,799,684 | A | * | 4/1931 | Gilbert | F04F 5/08 96/171 |
| 1,985,577 | A |   | 12/1934 | Mishelevich | |
| 2,889,044 | A | * | 6/1959 | Cloos | B03B 5/626 494/47 |
| 3,168,466 | A | * | 2/1965 | Milne | E02F 3/94 210/94 |

(Continued)

FOREIGN PATENT DOCUMENTS

CN          102414042 A      4/2012

OTHER PUBLICATIONS

Greenspan, "Secondary Flow in a Curved Tube", Computer Sciences Department University of Wisconsin, vol. 57, pp. 1-43, Jun. 1972.

(Continued)

*Primary Examiner* — Dung H Bui
(74) *Attorney, Agent, or Firm* — Bachman & LaPointe, P.C.

(57) ABSTRACT

A tubular filter for dynamic cleaning of an air flow containing suspended particles and a system for filtration using this filter includes a flow channel (1), carried out curved and a unit (6, 8) for generating an air flow in the flow channel (1). The tubular filter is arranged in a low pressure chamber (2) and is configured to generate Dean vortices in its curved portion. On outer and inner parts of the curved portion of the flow channel (1) are provided outer (10) and inner (20) openings, respectively, for discharging suspended particles from the flow channel (1) in the low pressure chamber (2).

(Continued)

The system for filtration includes a filtration unit (22) with at least one tubular filter (21), a control unit (17) for controlled regulation of the unit (6) for generating a flow in the flow channel (1) and an electric power supply unit (18).

20 Claims, 8 Drawing Sheets

(56) References Cited

U.S. PATENT DOCUMENTS

| | | | | |
|---|---|---|---|---|
| 3,616,911 | A * | 11/1971 | Rodriguez | B01D 21/00 209/459 |
| 3,706,383 | A * | 12/1972 | Palma | B01D 45/16 210/374 |
| 3,768,658 | A * | 10/1973 | Palma | B01D 21/265 55/447 |
| 3,875,061 | A * | 4/1975 | Palma | B04B 5/00 210/243 |
| 3,951,813 | A * | 4/1976 | Palma | B01D 21/265 210/512.1 |
| 4,133,762 | A * | 1/1979 | Visceglia | C02F 1/283 96/144 |
| 4,231,763 | A * | 11/1980 | Baisden | F01N 3/2882 422/177 |
| 4,491,460 | A | 1/1985 | Tokar | |
| 4,678,588 | A * | 7/1987 | Shortt | B01D 45/16 210/512.1 |
| 4,723,972 | A * | 2/1988 | Leach | B01D 53/24 55/398 |
| 5,088,192 | A * | 2/1992 | Dempsey | F28D 7/024 29/726.5 |
| 5,248,421 | A * | 9/1993 | Robertson | B01D 17/0217 210/512.1 |
| 5,782,522 | A | 7/1998 | Debono | |
| 6,569,323 | B1 | 5/2003 | Pribytkov | |
| 9,610,525 | B2 * | 4/2017 | Gentry | B01D 53/24 |
| 2004/0163369 | A1 * | 8/2004 | Lombana | B01D 45/12 55/452 |
| 2009/0050538 | A1 | 2/2009 | Lean et al. | |
| 2015/0157972 | A1 * | 6/2015 | Bratten | B01D 45/06 96/397 |
| 2015/0345439 | A1 * | 12/2015 | Gomez | F02M 35/104 123/184.21 |
| 2016/0023145 | A1 | 1/2016 | Greco et al. | |
| 2017/0122170 | A1 | 5/2017 | Fahrenkrug et al. | |
| 2019/0247786 | A1 * | 8/2019 | Thieben, Jr. | B21D 9/05 |
| 2021/0316241 | A1 * | 10/2021 | Scaife | B04C 7/00 |

OTHER PUBLICATIONS

International search report for patent application No. PCT/IB2020/059448 dated Dec. 4, 2020.

Corrected International search report for patent application No. PCT/IB2020/059448 dated Dec. 4, 2020.

* cited by examiner

TUBULAR FILTER AND SYSTEM FOR FILTRATION OF POLLUTED AMBIENT AIR

TECHNICAL FIELD

The invention relates to a tubular filter and a system for filtration of polluted ambient air. In particular the apparatuses according to the invention are applicable to the dynamic cleaning of an air flow from suspended particles contained therein, such as dusts, soots, pollen, bacteria, viruses, water droplets, oils and other solid particles and liquids.

PRIOR ART

Systems are known which clean an air flow from suspended particles contained therein. Such systems are usually employed in automotive filters, personal respirators and other personal air filtering systems. Cyclotron appliances for cleaning air are known that use the movement of the air to be cleaned along a helical line, as a result of which the particles contained in the air under the influence of centrifugal forces shift to the outer wall of the cylindrical filter along which the air flow moves, and are subsequently discharged by any means from the areas adjacent to the lateral outer wall, thus reducing the concentration of suspended particles in the remaining air flow. An example of the use of such cleaning of an air flow moving along a helical line within a cylindrical housing is the air filter known from U.S. Pat. No. 4,491,460. The shortcoming of such systems is the possibility that only the largest particles, subjected to the centrifugal forces occurring in the helical movement, localize at the cylindrical surface, deflecting the direction of movement of the flow of air to be cleaned. The small suspended particles remain in the air flow, requiring its further cleaning.

The invention makes it possible to remove not only the largest suspended particles from the curved fluid flow, but also the smaller particles, which are practically not subjected to the influence of centrifugal forces, as well as to create a system for cleaning air, based on that principle.

SUMMARY OF THE INVENTION

The object of the invention is to create a tubular filter of dynamic cleaning of a fluid flow and a system for filtration of polluted ambient air by using such a filter, wherein the cleaning of the fluid from suspended particles is implemented, among others, during movement of the fluid along a curved trajectory for relatively large as well as for relatively small suspended particles.

This task is solved in accordance with the tubular filter as disclosed herein and the system for filtration of air also as disclosed herein, using this filter. The most preferred embodiments of the invention are presented in the subclaims.

Figure 1:
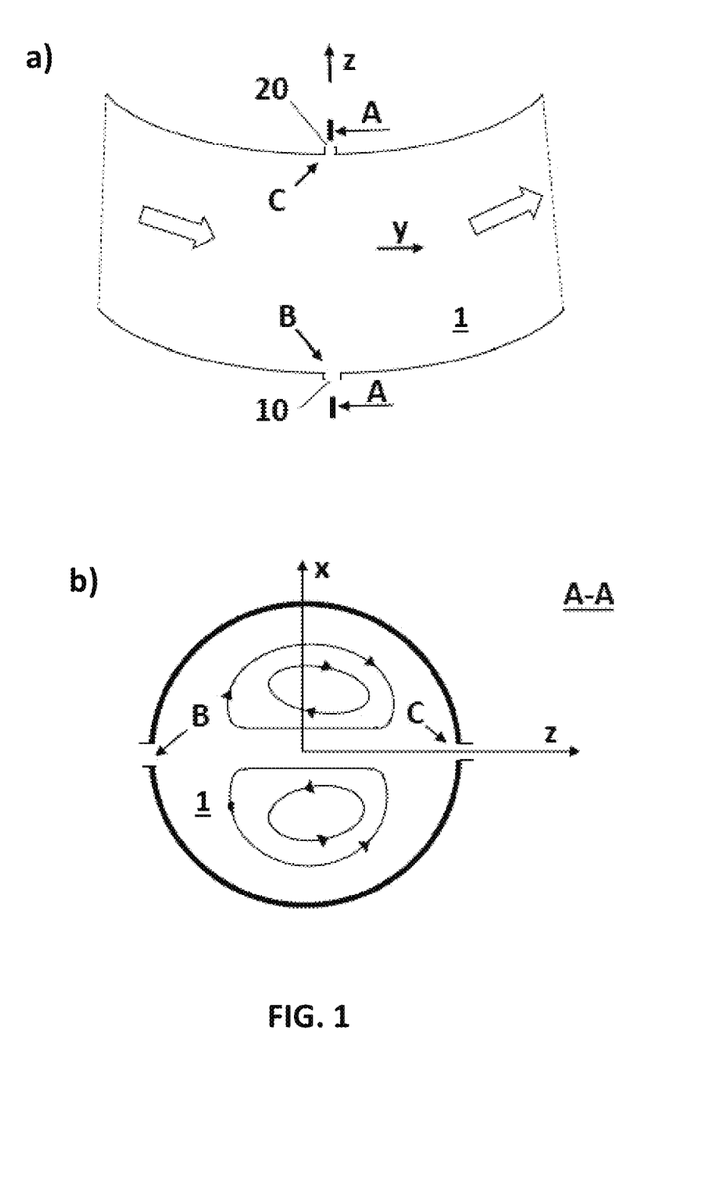
FIG. 1 schematically shows the occurrence of Dean vortices in the curved channel.

The principle of cleaning the fluid from particles suspended therein is based on the utilization of Dean vortices occurring in curved tubes, named for the British scientist who first researched them theoretically. FIG. 1a schematically shows a part of the curved tube, indicating the direction of movement of the fluid flow therein. FIG. 1b shows two areas within the jet of the flow forming two counter-rotating Dean vortices forming within the curved channel shown in FIG. 1a. From the article by D. Greenspan, "Secondary flow in a curved tube", J. Fluid Mech., 1973, V. 57. p. 167-176, it is known that Dean vortices are formed within a curved channel in a range of Dean numbers from 10 to 5000. The Dean number Dn can be expressed through the Reynolds number Re, the characteristic cross section dimension of the channel L, which is usually the diameter of the tube and the radius of curvature of the channel r along which the liquid flows, as follows:

$$Dn = \text{Re}\sqrt{\frac{L}{r}} \quad (1)$$

Within the scope of the invention it has been established as a result of theoretical calculations and experiments that the large particles contained in the flow, on which the centrifugal force acts, are most concentrated at the outer part of the curved channel shown in FIG. 1a by the letter B. The small suspended particles of the flow are more strongly subjected to the effect of the Dean vortices carrying them to the inner part of the curved channel, shown in FIG. 1a by the letter C. Thus the relatively large suspended particles of the flow generally concentrate at the outer part of the curved channel, while the relatively small suspended particles of the flow concentrate at the inner part of the curved channel. According to the invention the curved channel is arranged in a chamber with reduced pressure of the fluid, with a pressure that is reduced with respect to the pressure of the flow in the flow channel, which causes a discharge of the relatively large suspended particles from the flow through outer openings in the outer part of the curved channel (element 10 in FIG. 1a), while the relatively small suspended particles are discharged from the flow into the low pressure chamber through inner openings in the inner part of the curved channel (element 20 in FIG. 1a). Alternatively, the openings in the flow channel can be provided at any location on the surface of the flow channel.

The core of the invention is laid out in detail in the appended description and further explained by the drawings. However, the description as well as the drawings just serve to illustrate the invention and do not limit its embodiments within the scope of the claims.

DETAILED DESCRIPTION

The invention describes a tubular filter and a system for filtration by using such a filter for forced cleaning of a fluid from particles suspended therein. The fluid can be air with contaminating substances and particles contained therein, or any other fluid. The suspended particles include: Particles of dust, soot, pollen, bacteria, viruses, as well as any other small particles contained in the fluid flow in a suspended state. The filter is used either as a stationary apparatus in a means of transport for cleaning incoming gases, in a ventilation system for cleaning air entering a room or a space, or as a proposed portable mobile user device, for example as a mobile system for filtration of air with a mask, or as an embedded respirator integrated into a bicycle or motorcycle helmet or the like.

The main element of the system for filtration according to the invention is a tubular filter with a curved flow channel that allows the creation of a more compact system for cleaning a fluid compared to a rectilinear flow channel, with a better quality cleaning of the fluid from particles suspended therein. Such a compact system is more comfortable for the user and simultaneously facilitates an improvement of the result of the cleaning of the fluid compared to known flow filters.

As mentioned above, FIG. 1b schematically shows the occurrence of Dean vortices in a curved flow channel 1 of the tubular filter that (the channel) is shown in FIG. 1a in a low pressure chamber encompassing it (not shown in FIG. 1a). The flow of air fluid guided from the left to the right in the channel causes the formation of Dean vortices in the curved flow channel 1, shown in FIG. 1b. The relation of the radius of curvature of the flow channel 1 and the diameter of the flow channel 1 is such that it facilitates the formation of Dean vortices in the curved flow channel 1 for a specific fluid in a range of Dean numbers from 10 to 5000 in accordance with the equation (1) given above. The radius of curvature of the axis of the curved flow channel 1 and also the radius of the flow channel 1 itself can be constant for the entire flow channel 1 or can change from the inlet opening of the flow channel to its outlet opening, maintaining the conditions for the formation of the Dean vortices in the flow channel. In a most preferred embodiment of the flow channel it is formed with a circular cross section. However, the cross section can also be elliptical or rectangular. The shape of the channel itself can be helical, spiral or at least partially meandrous.

As indicated above, under the influence of the centrifugal force in the curved flow channel 1 the largest suspended particles turn to the outer wall of the channel that has a larger radius of curvature compared to the axis of the channel, while the relatively small suspended particles are drawn by the secondary current, i.e. the Dean vortices, to the inner wall of the channel that has a smaller radius of curvature compared to the radius of curvature of the axis of the flow channel.

The curved flow channel is arranged in a low pressure chamber, in which the pressure is lower than the pressure of the fluid in the flow channel. On the outer wall of the flow channel 1, openings 10 are arranged, through which the relatively large suspended particles are discharged from the flow channel 1 due to the pressure difference in the flow channel 1 and the low pressure chamber. On the inner wall of the flow channel 1, openings 20 are arranged, through which the relatively small suspended particles are discharged from the flow channel 1 due to the pressure difference in the flow channel and in the low pressure chamber.

According to one embodiment of the invention the diameter of the outer openings 10 is larger compared to the diameter of the inner openings 20 or smaller than this diameter. Alternatively, the diameter of the outer openings 10 is made equal to the diameter of the inner openings 20. Thereby, the openings in the flow channel can be arranged along the whole surface of the flow channel 1. In this case the outer openings are the openings arranged primarily at the outer portion of the flow channel 1, i.e. arranged at a distance from the center of curvature of the curvature of the flow channel that is larger or equal to the radius of curvature of the curvature of the flow channel. Accordingly, the inner openings are the openings arranged primarily at the inner portion of the flow channel 1, i.e. arranged at a distance from the center of curvature of the curvature of the flow channel that is smaller than the radius of curvature of the curvature of the flow channel 1.

Figure 2:
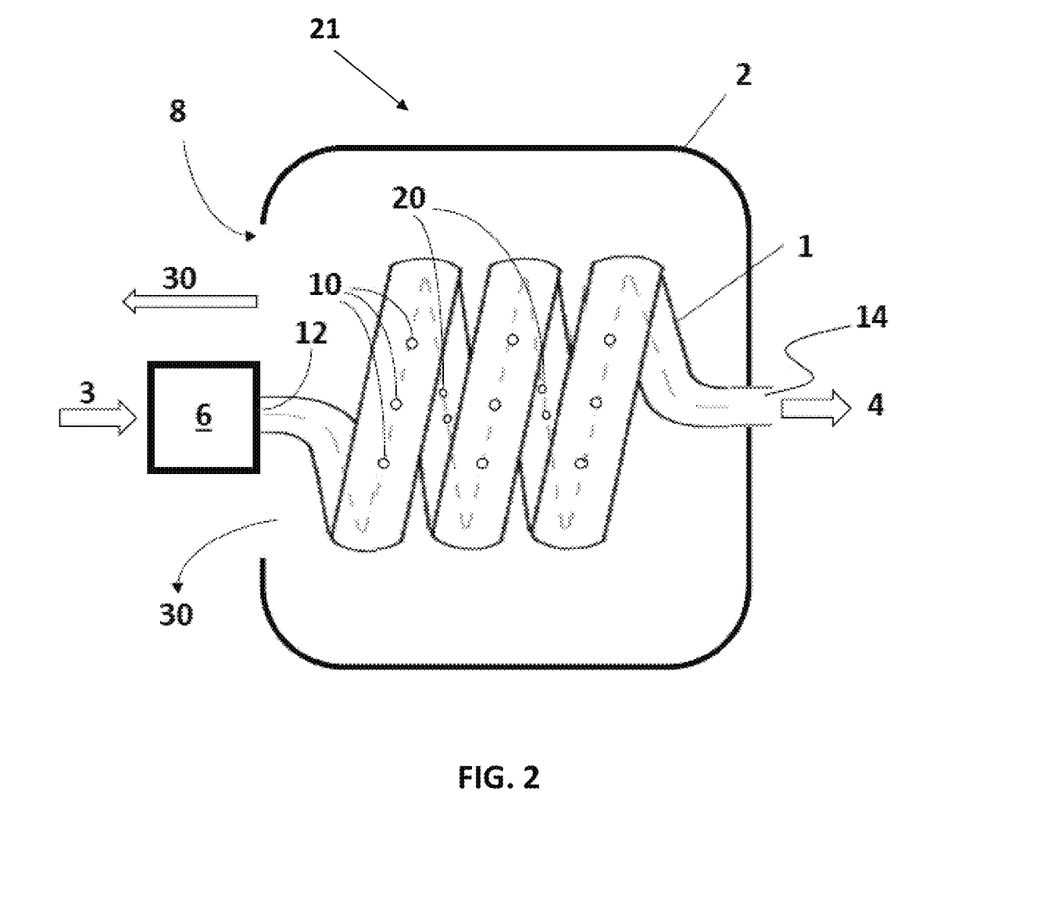
FIG. 2 shows one of the embodiments of the tubular filter.

FIG. 2 shows one of the embodiments of the tubular filter 21 according to the invention. The flow channel 1 is shaped as a curved tube with a circular cross section, curved along a helical line with three windings. The three windings of the flow channel 1 are shown just for the sake of clarity, there can be more than three as well as less than three of them. Also, the flow channel can have a spiral form, an at least partially meandrous form or a combination of these three forms. The flow channel 1 comprises an inlet opening 12 and an outlet opening 14. The curved flow channel 1 is enclosed in a sealed casing impermeable for the fluid, which forms the low pressure chamber 2. The low pressure chamber 2 tightly abuts the flow channel 1 on the side of the outlet opening 14 of the flow channel 1. The low pressure chamber 2 is open on the side of the inlet opening 12 of the flow channel 1, forming an outlet opening 8 of the low pressure chamber 2. In front of the inlet opening 12 of the flow channel 1 is arranged a unit 6 for generating an air flow in the flow channel 1, implemented in the form of an injector pump abutting tightly on the inlet opening 12 of the flow channel 1. The unit 6 for generating an air flow in the flow channel 1 serves to generate a fluid flow in the flow channel 1, the fluid, particularly air, entering it as shown by the arrow 3, passing through the channel 1, being cleaned from suspended particles and exiting from the flow channel 1 through the outlet opening 14, as shown by the arrow 4. Due to the injection of the fluid into the flow channel 1 by the unit 6 for generating an air flow a pressure difference is created, with an increased pressure of the fluid in the flow channel 1 in relation to the pressure in the low pressure chamber 2, in which the windings of the flow channel 1 are arranged.

Due to the above-mentioned pressure difference in the flow channel 1 and in the low pressure chamber 2, the relatively large suspended particles that are concentrated at the outer part of the channel 1 are discharged through the openings 10 from the channel 1 into the low pressure chamber 2. Due to the occurrence of Dean vortices in the flow channel 1 the relatively small suspended particles are carried to the side of the inner part of the channel 1 and concentrate at the inner part of the channel 1, resp. are discharged through the inner openings 20 from the channel 1 into the low pressure chamber 2. The fluid with the suspended particles discharged through the outer openings 10 and the inner openings 20 is discharged through the outlet opening 5 of the low pressure chamber 2 to the outside, as shown by the arrows 30. In FIG. 2 the outlet opening 5 of the low pressure chamber 2 is arranged immediately adjacent to the unit 6 for generating an air flow in the flow channel 1. However, preferably the flow 30 to be discharged is guided from the low pressure chamber 2 to the side away from the inlet flow 3, that is, with a spatial separation from the inlet flow 3 to avoid a mixing of the flow 30 to be discharged from the low pressure chamber 2 with the inlet flow 3. The outlet opening 5 of the low pressure chamber 2 can be arranged in any place of the low pressure chamber 2, for example in its lateral part (not shown).

According to one embodiment of the invention the diameter of the outer openings 10 arranged at the outer part of the curved portion of the flow channel 1, that is, at maximum distance from the center of curvature of the curved portion, is larger compared to the diameter of the inner openings 20 formed at the inner part of the curved portion of the flow channel 1, that is, with minimum distance from the center of curvature of the curved portion. The diameter of the outer and inner openings 10, 20 is formed depending on the size of the suspended particles in the specific fluid to be filtered. Alternatively, the diameter of the outer and inner openings 10 and 20 can be carried out equal. It has been established by experiments that local increased pressure areas can form in the channel 1 at its outer surface, depending on the geometry of the curved portion of the channel 1 and the fluid flow parameters, where the concentration of the relatively large particles is increased. In one of the variants of arrangement of the outer openings 10, the arrangement of these openings is provided precisely in these increased pressure areas, facilitating a more effective discharge of the relatively large particles from the fluid flow. Moreover it has been observed that the location of the Dean vortices depends also on the local degree of curvature of the flow channel 1 and of the flow parameters, wherein the Dean vortices at the inner part of the curved portion of the flow channel 1 form a reduced pressure area with an increased concentration of relatively small suspended particles. In one of the embodiments of the filter an arrangement of the inner openings at the inner part of the curved portion of the flow channel 1 is provided precisely in these reduced pressure areas, increasing the effectivity of the discharge of the relatively small suspended particles from the flow. The formation of local increased pressure areas at the outer part of the curved portion of the flow channel, respectively, of reduced pressure areas at the inner part of the curved portion of the flow channel is achieved also by a local change of the radius of curvature of the flow channel 1 (not shown) or by providing the inner surface of the channel 1 with local constrictions or obstacles (not shown), enhancing the effect of forming increased pressure areas and forming Dean vortices in the fluid flow, thus forming a collection area of suspended particles intended for discharge. In this case the outer openings 10 and the inner openings 20 are positioned in corresponding increased pressure areas, resp. in reduced pressure areas, or the concentration of these openings in these areas exceeds the concentration of these openings in the other areas of the channel 1.

In one of the embodiments of the invention constrictions or obstacles are provided on the inner surface of the low pressure chamber, forming an area of collection and/or precipitation of the suspended particles discharged from the flow channel 1 (not shown). This embodiment makes it possible not to expel the suspended particles with the flow 30 exiting the low pressure chamber 2, or to expel not all suspended particles, but to collect them on the inner walls of the low pressure chamber 2 with the aim of subsequently removing them periodically.

In one of the embodiments of the invention the outer and inner openings 10, 20 are coverable in a controlled way, allowing to leave open only those openings that are positioned in the above-described areas of increased or reduced pressure in the flow channel 1 with maximum concentration of suspended particles.

The flow channel 1 can be integrated into a housing or is removable, that is, it can be extracted from the low pressure chamber 2, allowing a periodic cleaning of the flow channel 1.

Additionally a composition can be applied on the inner surface of the flow channel 1 and/or the low pressure chamber 2 having adhesive and/or disinfecting properties, on which the suspended particles and/or viruses and bacteria settle and/or are neutralised. This facilitates a more effective cleaning of the fluid of particles suspended therein (not shown). As one variant a protein composition can be applied to which viruses or bacteria adhere due to the ionic-cationic compounds when contacting them. The impregnating compound can comprise other ingredients having properties that bind the suspended particles, including disinfecting or bonding substances.

According to one of the embodiments of the invention the filter comprises several flow channels (not shown) having a common inlet opening for intake of the fluid and a common outlet opening for discharge of the cleaned fluid from the flow channels. This facilitates an increase in the productivity of the filter due to the increase of the volume of the fluid to be processed.

Figure 3:
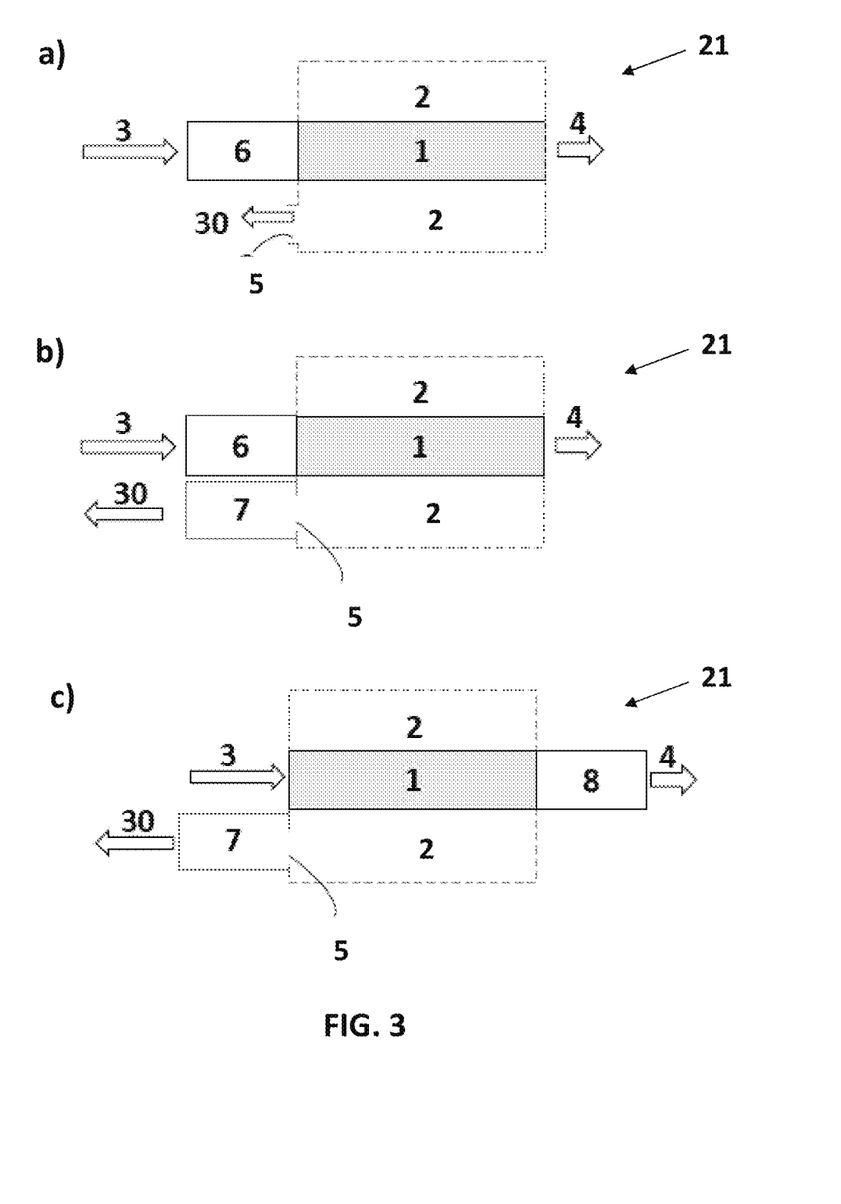
FIG. 3 schematically shows three possible embodiments of the tubular filter.

FIG. 3 shows under the letters a, b and c three possible embodiments of connection of the proposed tubular filter 21. FIG. 3a schematically shows the embodiment of implementation of the tubular filter 21 presented in FIG. 2. The reference numbers correspond to the reference numbers in FIG. 2. FIG. 3 renders only an overall general sequence scheme of the connection of the different elements of the tubular filter 21 with regard to one another. The schematically shown flow channel 1 is connected to the low pressure chamber 2 having an outlet opening 5. At the inlet of the flow channel 1 the unit 6 for generating an air flow is arranged, through which the fluid 3 is taken in from the environment and injected into the flow channel 1, from which the cleaned by the tubular filter 21 fluid 4 is discharged. Due to the unit 6 for generating an air flow an increased pressure is created in the flow channel 1 compared to the low pressure chamber 2. The filtered suspended particles pass from the flow channel 1 into the low pressure chamber 2 and are discharged into the ambient atmosphere through the outlet opening 5 of the low pressure chamber 2 in the direction of the arrow 30.

FIG. 3b shows an alternative embodiment of the connection of the proposed tubular filter 21, differing from the embodiment shown in FIG. 3a only in that to the outlet opening 5 of the low pressure chamber 2 is connected a unit 7 for generating low pressure carried out in the form of a first suction pump, facilitating a reduction of the pressure in the low pressure chamber 2 and thus increasing the fluid flow from the flow channel 1 through the outer and inner openings into the low pressure chamber 2, wherein this flow carries away the filtered suspended particles. This construction of the filtering apparatus facilitates an increase in the effectivity of the filtering process.

FIG. 3c shows an alternative embodiment of the connection of the proposed tubular filter 21, differing from the embodiment shown in FIG. 3b only in that as the unit for generating an air flow in the flow channel 1 instead of the injector pump 6 connected to the inlet opening of the flow channel 1 a second suction pump 8 is provided, connected to the outlet opening of the flow channel 1. In this case the fluid flow in the flow channel 1 is created by the second suction pump 8, sucking the fluid into the inlet opening of the flow channel 1 in the direction indicated by the arrow 3, while after passing the flow channel 1 the fluid flow cleaned from the suspended particles is guided in the direction indicated by the arrow 4, being pumped through the second suction pump 8. In this embodiment it is important that the unit 7 for generating low pressure creates less pressure in the low pressure chamber than the second suction pump 8 in the flow channel 1.

Each of the above-mentioned embodiments of the connection of the proposed tubular filter 21 provides the possibility to clean the flow channel 1 and/or the low pressure chamber 2 by a process of blowing, rinsing or immersion in a cleaning solution.

Figures 4, 5:
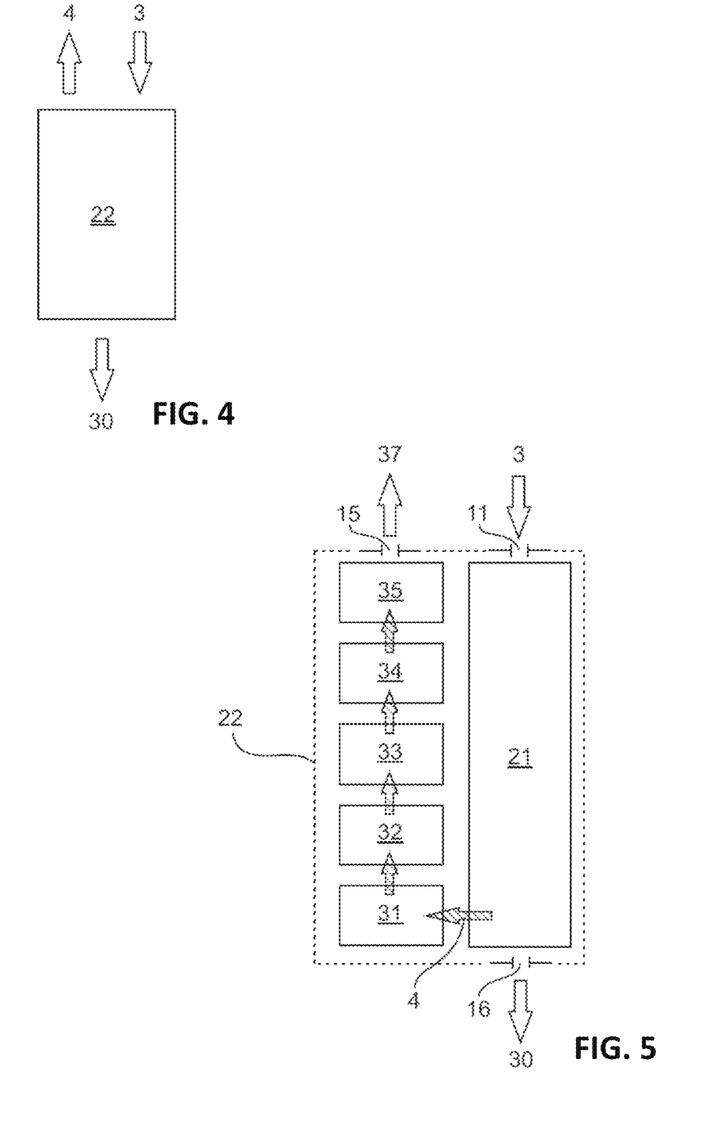
FIG. 4 schematically shows the principle construction of implementation of a filtration unit.
FIG. 5 shows a schematic image of a filtration unit with a tubular filter and five additional chambers.

FIG. 4 shows the principle construction of a filtration unit 22 with activated flows of a fluid therein, in particular air. The arrow 3 symbolically refers to an entering air flow that is to be cleaned. The arrow 30 refers to an air flow that is discharged from the low pressure chamber. The arrow 4 refers to an air flow that is cleaned by the filtration unit 22.

FIG. 5 shows the principle block diagram of a filtration unit 22 device according to one of the embodiments of the filtration unit 22. A compulsory part of the filtration unit 22 is the tubular filter 21 in any of the embodiments described above. The entering air flow that is to be cleaned enters the tubular filter 21 through an inlet opening 11 for feeding ambient air into the tubular filter 21. The arrow 30 refers to an air flow that is discharged through an outlet opening 16 from the low pressure chamber and that contains suspended particles filtered by the tubular filter 21. The cleaned by the tubular filter 21 air flow 4 enters a first chamber 31 of the filtration unit 22. The chambers 31-35 shown in FIG. 5 are zones for carrying out particular functions described below. The number and order of location of the chambers 31-35 can vary depending on the task to be fulfilled by the filtration system. In FIG. 5 showing an embodiment example of the filtration unit 22, the cleaned air flow is directed successively from one chamber into the other, as shown by the upright directed arrows arranged between the individual chambers 31-35.

The first chamber 31 is the chamber for depositing suspended particles of the flow not filtered in the flow channel 1 on the walls and/or on the bottom of the first chamber. The inlet opening of the first chamber 31 is connected to the outlet opening of the flow channel of the tubular filter 21, and the first chamber 31 itself is arranged so as to move the air flow at least along one of its portions from the bottom upwards, being a gravitational filter thereby. Therein, the suspended particles of the flow not filtered in the flow channel of the tubular filter 21 can deposit on the bottom of the first chamber and/or on its walls. The outlet of the first chamber 31 is connected to the inlet of the second chamber 32 with filters of the type HEPA or ULPA arranged inside for filtering the suspended particles not filtered by the first chamber 31. Functionally, it is not compulsory that the first and second chambers 31, 32 are separated, but alternatively the above mentioned filters of the second chamber 32 can be arranged in the upper portion of the first chamber 31. The provision of the first chamber 31 is optional, so that in alternative embodiments of the filtration unit 22 the first chamber 31 can be absent. The outlet of the second chamber 32 is connected to the inlet of the third chamber 33 for introducing additional substances into the air flow. So, there are nozzles (not shown) in the third chamber 33 for injecting aromatic and/or medicinal substances into the air flow that flows through the third chamber 33. This provides the option, if necessary, to aromatize the air supplied for breathing to the user and/or to add medicinal substances to the previously cleaned air flow, for example, in case of asthmatic illnesses. The provision of the third chamber 33 is optional, so that in alternative embodiments of the filtration unit 22 the third chamber 33 can be absent. The outlet of the third chamber 33 is connected to the inlet of the fourth chamber 34 that represents a chamber for conditioning previously cleaned air flow. In the fourth chamber 34 is arranged an apparatus for heating and/or cooling the air flow that passes through the apparatus. This allows in countries with hot climate to cool the cleaned air flow, or vice versa, at low temperatures of the ambient air to heat the cleaned air flow passing through this chamber up to a comfort temperature, for example from 20° C. to 40° C. The provision of the fourth chamber 34 is optional in the filtration unit 22, so that in alternative embodiments of the filtration unit 22 the fourth chamber 34 can be absent. The outlet of the fourth chamber 34 is connected to the inlet of the fifth chamber 35 for humidifying or drying the air flow passing this chamber. The fifth chamber 35 allows to provide the air passing the chamber with a comfortable humidity level for the user, for example by humidifying or drying the air passing the chamber up to an acceptable level, for example to the humidity level of 30 to 60%. The provision of this chamber 35 is optional, so that in alternative embodiments of the filtration unit 22 the fifth chamber 35 can be absent.

One subject matter of the proposed invention is a system for filtration of polluted ambient air according to claim 3 of the invention. The proposed system for filtration of polluted ambient air comprises at least one filtration unit 22 as shown for example in FIG. 4 or FIG. 5 with at least one tubular filter 21. The filtration unit is provided thereby with an inlet opening 11 for feeding a flow of ambient air into the tubular filter 21, an outlet opening 15 of the filtration unit 22 for discharging cleaned air from the filtration unit 22 and an outlet opening 16 for discharging suspended particles from a low pressure chamber. The filtration unit 22 is also provided with a control unit for controlled regulation of a unit 6 for generating an air flow in a flow channel 1, as well as an electric power supply unit. Such a system for filtration can be used for example for cleaning air when it is fed to living accommodations, to the interior of a vehicle or to a respiratory mask to be worn on the face of a user. The advantage of this system for filtration is the option of washing and/or disinfecting filtering devices with their multiple subsequent use.

Figure 6:
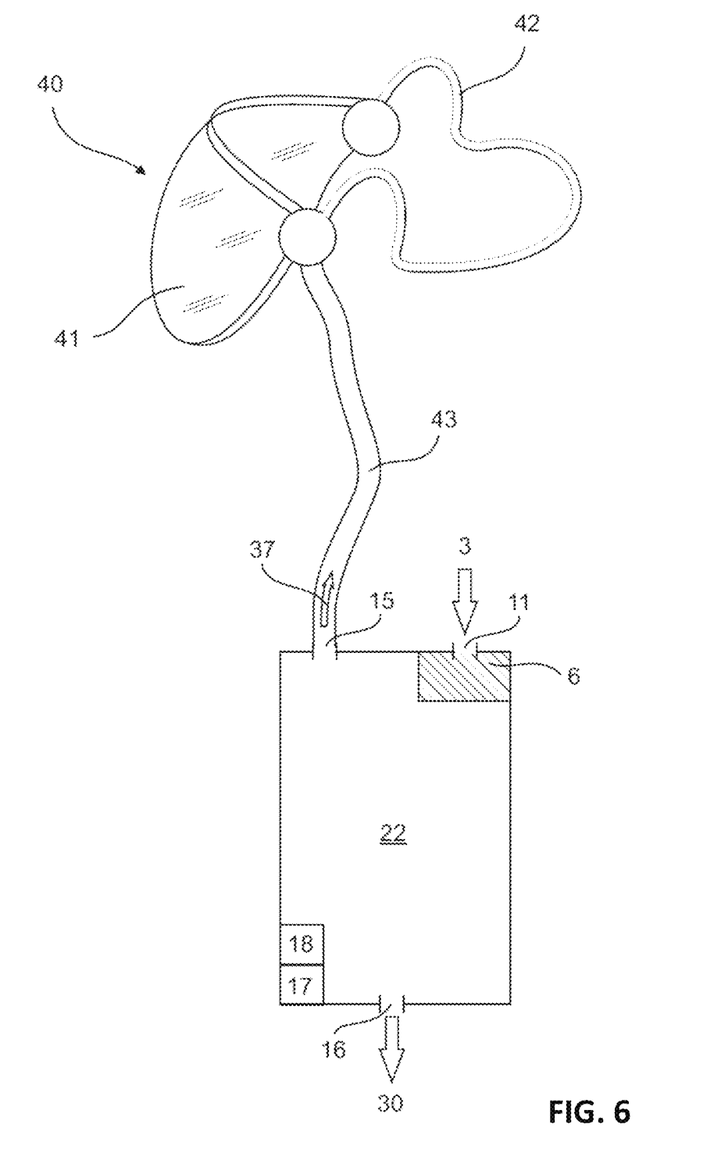
FIG. 6 shows the principle chart of operation of the filtration system.

A principle chart of operation of one embodiment of the system for filtration is shown in FIG. 6. The system for filtration has a filtration unit 22 consisting, as shown above, of at least one tubular filter (not shown). The ambient air enters the filtration unit 22 through the inlet opening 11 for its feeding into the tubular filter (not shown). The direction of movement of the air entering the filtration unit 22 is referred to by the arrow 3. Further, as described above, the fed into the tubular filter 21 entering air flow 3 is injected into a flow channel of the tubular filter (not shown) by the unit 6 for generating an air flow. The suspended particles filtered from the entering air flow 3 are deflected from a low pressure chamber (not shown) arranged in the filtration unit 22 through the outlet opening 16. The air cleaned by the filtration unit 22 is discharged therefrom through the outlet opening 15 of the filtration unit, entering through an air pipe 43 a respiratory mask 40. The filtration unit 22 includes a control unit 17 for controlled regulation of the unit 6 for generating an air flow, an electric power supply unit 18 for allowing the operation of the control unit 17 and of the unit 6 for generating an air flow. It goes without saying that the electric power supply unit 18 can be also used for other systems which are optionally used in the filtration unit 22. The respiratory mask 40 is to be worn on the face of a user and comprises a face part 41 covering at least the nose and mouth portion of the face of the user, as well as a head holder 42 for fastening the mask on the face of the user. Instead of the user's mask 40 shown in FIG. 6, according to another embodiment of the invention the cleaned air is supplied into the interior of a vehicle or into living accommodations.

Figure 7:
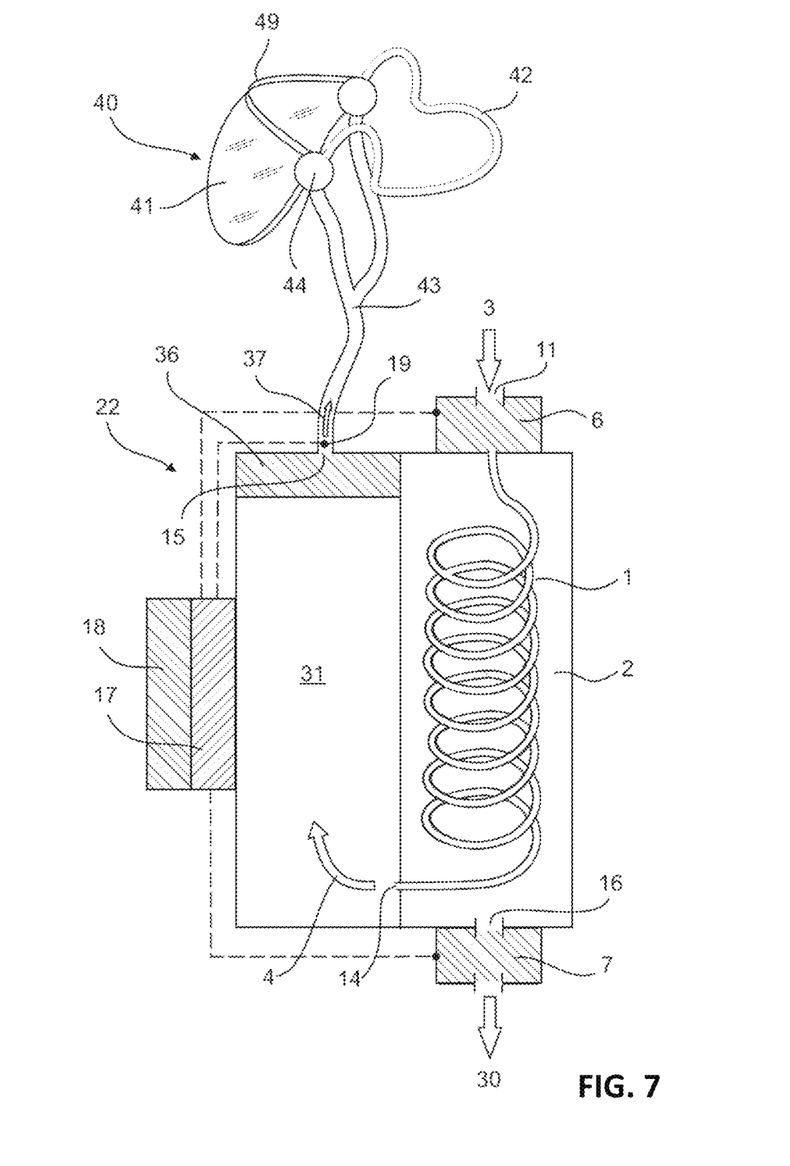
FIG. 7 shows an example of implementation of the filtration system with the filtration unit that comprises the tubular filter and the first chamber of the filtration unit.

FIG. 7 shows one embodiment of the system for filtration, the reference numbers of which correspond to the reference numbers in FIG. 6. For avoiding repetition of features described in connection with the system for filtration of FIG. 6, in the embodiment of the system for filtration of FIG. 7 only amended features will be considered. The filtration unit 22 shown in FIG. 7 comprises a tubular filter that includes a unit 6 for generating an air flow in a flow channel 1, the flow channel 1 the inlet of which is connected to the said unit 6 for generating an air flow, and an outlet to a first chamber 31. The flow channel 1 is enclosed in a low pressure chamber 2 comprising an outlet opening 16 for discharging suspended particles from the low pressure chamber 2 and a unit 7 for generating low pressure in the low pressure chamber 2. The first chamber 31 is connected to an outlet opening 14 of the flow channel 1 and is arranged so as to move the air flow upwards when the filtration unit 22 is in operation. The first chamber 31 is thereby a gravitational filter, wherein suspended particles not filtered in the flow channel 1 due to gravitation force deposit and sediment on the bottom and/or on the walls of the first chamber 31. The cross sectional dimension and height of the first chamber 31 are selected such that the suspended particles contained in an air flow 4 cleaned by the tubular filter deposit due their own weight on the bottom of the chamber and are not transported by this flow into the upper portion of the first chamber 31. In the upper portion of the first chamber 31 is arranged a HEPA filter 36 for additional cleaning of the air and is provided an outlet opening 15 of the filtration unit, through which a flow 37 to be discharged from the filtration unit 22 along an air pipe 43 connected to the outlet opening 15 is directed to a respiratory mask 40. The air pipe 43 is connected to the respiratory mask 40 by means of two connecting units 44 arranged on both sides of the mask 40, wherein the air pipe from the mask's side is split off so that the flow 37 discharged from the filtration unit enters the mask through both connecting units 44, namely, in the area defined by a face part 41 and the face of the user. From the side of connection to the outlet opening 15 the air pipe 43 can also be split off or joint in a common duct.

The control unit 17 is configured for controlled regulation of the unit 6 for generating an air flow in the flow channel and of the unit 7 for generating low pressure in the low pressure chamber 2. Therein, the control unit 17 is configured to control the pressure of the cleaned air in the outlet opening 15 of the filtration unit 22 by means of a sensor 19 that is arranged in immediate adjacency to the outlet opening 15 of the filtration unit. Alternatively, the sensor 19 can be arranged at any location of the first chamber 31, at any location of the air pipe 43 or in one of the connecting units 44. The functional connection between the control unit 17 and the listed above devices, to which it is connected, is shown schematically in FIG. 7 by dashed lines. An electric power supply unit 18 is functionally connected to the control unit 17, to the apparatus 6 for generating a flow, to the unit 7 for generating low pressure, and depending on the construction of the pressure sensor 19 to this sensor 19. The control unit 17 is configured to control the cycle and volume of the air fed into the tubular filter depending on the pressure of the cleaned air in the outlet opening 15 of the filtration unit, allowing due to a decrease of pressure in the mask 40 and the air pipe 43, respectively, in the outlet opening 15 of the filtration unit when the user inhales and an increase of pressure when the user exhales, to control the operation of the unit 6 for generating an air flow in the tubular filter. In an alternative embodiment of the system for filtration the control unit 17 is configured to control the cycle and volume of the air that is inhausted by the unit 7 for generating low pressure depending on the pressure of cleaned air in the outlet opening 15 of the filtration unit.

In an alternative embodiment of the system for filtration the control unit 17 is configured to maintain the pressure in the outlet opening 15 of the filtration unit, respectively, in the respiratory mask 40 for 0,001-20% above the atmospheric pressure during the time when the user inhales and the time when the user exhales. Therein, the respiratory mask 40 is configured to release the air due to excess pressure generated inside the mask in comparison to ambient pressure environment either through an insert 49 between the face of the user and a face part 41, and/or through a gapping location between the face part 41 and the face of the user, and/or through at least one opening and/or valve (not shown) provided in the mask 40.

In a most preferable embodiment of the system for filtration shown in FIG. 4, the filtration unit 22 is located in a single housing with an inlet opening 11 for feeding ambient air into the tubular filter, with the outlet opening 15 of the filtration unit for discharging cleaned air and with the outlet opening 16 for discharging suspended particles from the low pressure chamber. This allows using the filtration unit 22 as a mobile device that can be fastened to the body of a user by means of bands or other fastening devices.

Figure 8:
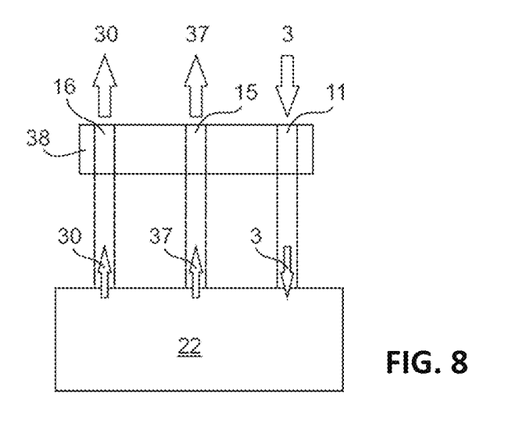
FIG. 8 shows a schematic image of the filtration unit with a remote unit with inlet and outlet openings of the filtration unit.

FIG. 8 shows an alternative embodiment of the filtration unit 22, wherein the inlet opening 11 for feeding ambient air into the tubular filter, the outlet opening 15 of the filtration unit for discharging cleaned air and the outlet opening 16 for discharging suspended particles from the low pressure chamber are arranged in a separate module 38 located at a distance from the single housing of the filtration unit 22. This allows locating the filtration unit 22 in a conventional backpack, wherein the external module 38 with inlet and outlet openings of the filtration unit 22 is arranged on the outer surface of the backpack, wherein the inlet opening 11 for feeding ambient air into the tubular filter and the outlet opening 16 for discharging suspended particles from the low pressure chamber are in direct contact with ambient air, thus allowing air flows 3 and 30 to enter the filtration unit 22 without restriction, respectively, to be discharged therefrom. In this embodiment of the system for filtration the air pipe 43 is connected directly to the outlet opening 15 of the filtration unit 22 located on the external module 38.

Figure 9:
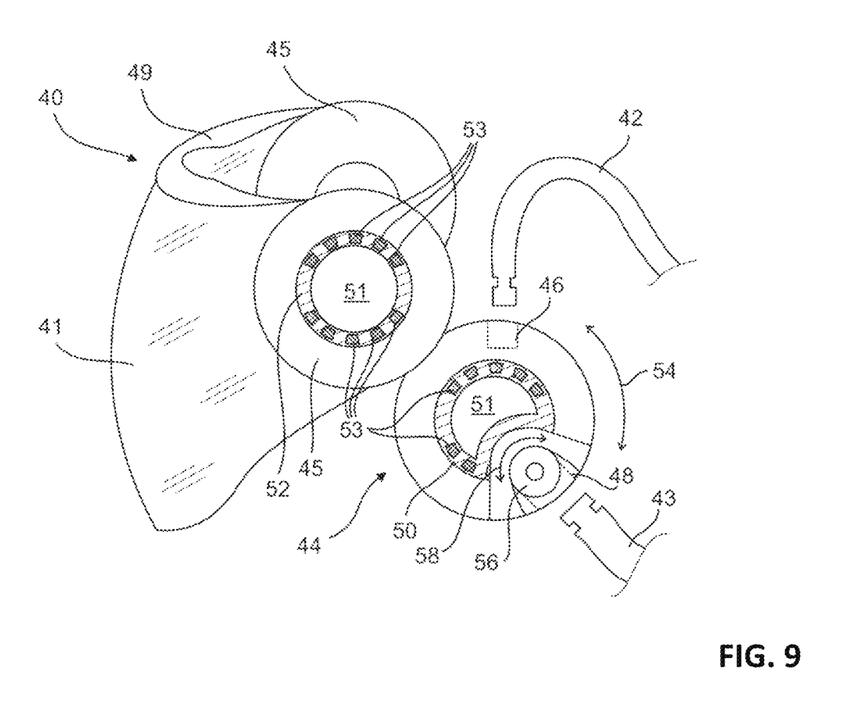
FIG. 9 shows an example of implementation of a respiratory mask with a construction of a connecting unit.

FIG. 9 shows an example of an embodiment of a respiratory mask 40 with a configuration of a connecting unit 44. On each of the opposing terminal areas of the transparent face part of the respiratory mask 40 is arranged a fastening ring 45 with magnetic ring elements 52 provided thereon. Each of the connecting units 44 is further carried out circular and having the shape of a flat cylinder. On the outer surface of the connecting unit 44 is provided a magnetic ring element 50 that, when the connecting unit 44 is applied to the fastening ring 45, is magnetically held thereon due to the attraction to each other of the magnetic ring element 50 of the connecting unit 44 and the magnetic ring element 52 of the fastening ring 45, as well as due to the elasticity of the face part 41, the fastening rings 45 of which press the connecting units 44 to the head of the user, overlapping them from the outside. Such fastening of the connecting unit 44 on the fastening ring 45 allows turning the connecting unit 44 around a common center 51 defined by the magnetic elements 50 and 52. The turning directions of the connecting unit 44 in relation to the fastening ring 45 are referred to by the arrow 54. Instead of the magnetic ring elements 50 and 52 or in addition to them magnets 53 can be used, arranged ark-like around the geometrical center 51 of the fastening ring 45, respectively, of the connecting unit 44 on fixed equispaced angular pitches from each other, on the surface of the fastening ring 45, as it is shown in FIG. 9, respectively, on the outer surface of the connecting unit 44. Such magnetic fastening of the connecting unit 44 to the fastening ring 45 allows stepwise changing of the rotation angle of the connecting unit 44 in relation to the fastening ring 45. This allows changing the wearing angle of the respiratory mask 40 on the face of the user, allowing the user by himself adjusting a required retaining angle of the mask 40 in a position convenient for the user. Alternatively to the embodiment of fastening the connecting unit 44 to the fastening ring 45 by means of magnets as shown in FIG. 9, the fastening can be accomplished by any known from the prior art method in a mobile or an immobile manner, for example, with geared projections with fixed offset steps.

In the peripheral part of the connecting unit 44 is arranged a fastening unit 56 of the air pipe 43 to the connecting unit 44, wherein is provided a recess 48 for a detachable connection of the air pipe 43 and the connecting unit 44. The fastening unit 56 of the air pipe is configured to be turned in the plane of the connecting unit 44 in a direction, referred to by the arrow 58. Such a pivot-like fastening of the fastening unit of the air pipe to the connecting unit 44 allows arranging the air pipe in a more convenient for the user wearing angle of the air pipe 43. Alternatively to the embodiment of fastening the air pipe 43 to the connecting unit 44 as shown in FIG. 9, the air pipe can be fastened thereto inseparable. The fastening unit 56 of the air pipe 43 is configured such that the air flow discharged from the filtration unit 22 directly penetrates into the space below the mask that is defined by the face part 41 of the respiratory mask, an insert 49 and the face of the user. The insert 49 is arranged on terminal areas of the face part 41 of the respiratory mask and provides for an adapting filling of the terminal regions of the space between the face of the user and the mask, as well as the fastening ring 45 of the face part of the mask 40. In a most preferable embodiment the insert 49 is made of a soft air permeable material, for example foam plastic.

The side surface of the connecting unit 44 is further provided with a recess 46 for fastening a head holder 42 on the connecting unit 44. The head holder 42 if configured to be removably fastened by its end element in the recess 46. Alternatively, the fastening of the head holder 42 to the connecting unit 44 can be inseparable. The head holder 42 is carried out in the form of a bent ear holder arranged at the hind head of the user. Alternatively, the head holder can be carried out as a band holder covering the parietal part of the head of the user. The embodiment of the mask shown in FIG. 9 allows detaching and newly attaching any of the elements, namely, the mask 40 itself, the head holder 42 or the air pipe 43 from the connecting unit 44 without removing the connecting unit 44 from the head and fastening it to the head with air pipes 43 attached thereto. Furthermore, this allows replacing the mask 40 without detaching the remaining elements from the connecting unit 44, wherein the replacing mask can be carried out covering half-face of the user or covering the face of the user completely.

Figure 10:
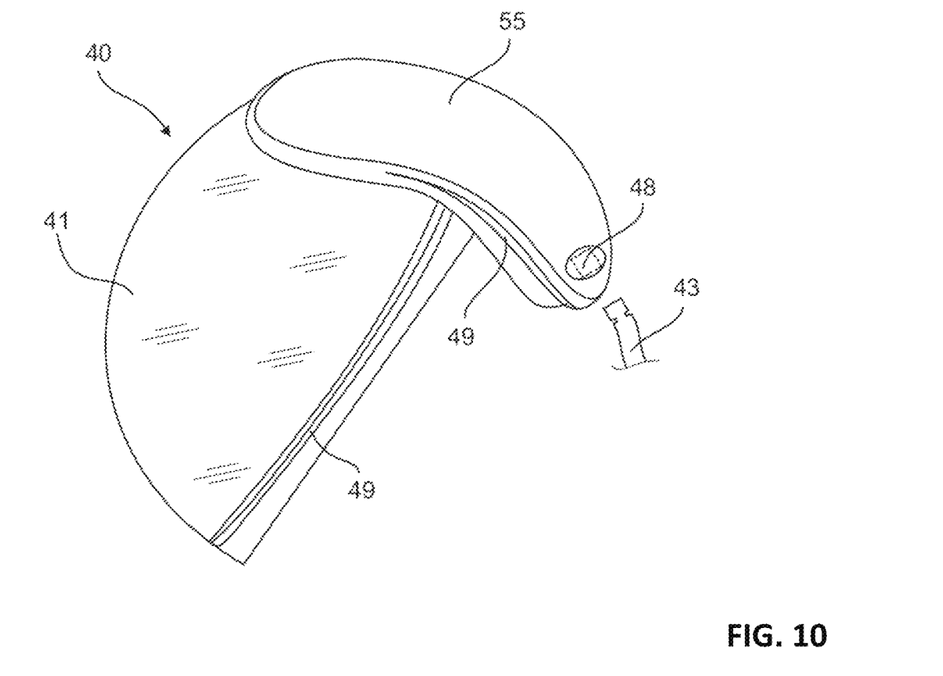
FIG. 10 shows an alternative embodiment of implementation of the respiratory mask with a holding connecting unit.

FIG. 10 shows an alternative embodiment of the mask 40 that can be used in the proposed system for filtration. The mask 40 has a face part 41 that is a full face shield, i.e. covering the face of the user completely from the chin to the forehead of the user. The face part 41 is made transparent and it can be tinted at least partially. In the upper part of the face part 41 is arranged a holding element 55 carried out such that at least its lower part is adjacent to the parietal region of the head of the user (not shown). In FIG. 10 the holding element 55 is shown with an oval shape in the direction from the face part 41 to the rear of the head of the user. The holding element 55 is carried out curved such that its lower part, that is adjacent to the face part 41, is concave downwardly in order to cover the parietal part of the head of the user. Alternatively, the holding element 55 can be carried with any shape, if viewed from above, for example round, basically rectangular or basically triangular. In this regard it is important that its lower part envelope the parietal part of the head of the user in order to hold the mask 40 on the head of the user without additional holding devices. In the rear part of the connecting holding unit 55, i.e. at its end that is distant from the face part 41 of the mask, is provided a recess 48 for detachable or non-detachable connection of the air pipe 43, that feeds air cleaned by the filtration unit into the mask 40 along a channel not shown in FIG. 10, the channel being arranged in the holding element 55 and starting in its rear part in the recess 48 and ending in the front part of the holding element 55 with an outlet into a space, formed by the inner surface of the mask 40 and the face or the head of the user, respectively. The cleaned air is fed into the mask 40 passing through the air pipe 43, installed in the recess 48, into the face part 41 of the respiratory mask 40. Along the periphery of the lower part of the holding element 55 as well as along the periphery of the face part 41 are arranged inserts 49 providing for an adapting filling of the terminal regions of the space between the parietal part of the head of the user and the connecting holding unit or between the face of the user and the face part 41, respectively. In a most preferable embodiment the insert 49 is made of a soft air permeable material, for example foam plastic. One advantage of the embodiment of the mask shown in FIG. 10 is the arrangement of the center of gravity of the mask with the holding element 55 installed thereon in the region of the parietal part of the head of the user, which allows holding the mask on the head of the user without additional holding tools.

The described above embodiments of the system for filtration allow cleaning the filtration unit 22 by pumping through at least one of its chambers 2, 31-35 a washing and/or a disinfecting fluid and their subsequent drying. For example, the system for filtration can be washed with running water by pouring it through the inlet and/or outlet openings of the filtration unit 22. Washing of the system for filtration is also possible by using a stationary base (not shown) configured to clean the filtration unit 22 by manual or automated cleaning by means of pumping through at least one of its chambers 2, 31-35 a washing and/or a disinfecting fluid and their subsequent drying. The drying process includes the use of ventilators arranged in the stationary base for drying the inner surfaces of the above mentioned chambers and pouring out the residual moisture. One can also use ventilator-pumps arranged in the stationary base for discharging the residual fluids. The stationary base is also configured for charging an electric power supply unit 18.

In an alternative embodiment of the system for filtration the control unit 17 is adapted for a wireless or wireline connection to a mobile device (not shown) for controlling the operation of the system for filtration and/or for displaying the functional parameters of the system for filtration.

The proposed system for filtration can be used either in individual systems for cleaning air as well as in systems for cleaning air in vehicles and cleaning air in accommodations.

When using the proposed system for filtration for filtering air in vehicles, for cleaning the air supplied into the interior of the vehicle, for inner circulation of the air in the interior or for cleaning the air to be supplied into the engine, the system can be used as the above described system in the form of the proposed tubular filter with injecting air inside thereof and subsequent passing the air into a chamber for additional cleaning by a HEPA filter, as it is shown in FIG. 7, or any other fine purification filter. The system can act as a fully realized filtering system or as a preliminary cleaning filter for regular cleaning systems for vehicles.

The use of the system allows to substantially extend the operational life of fine purification filters used for filtering particles in the air, which were not filtered by a tubular filter.

REFERENCE NUMBERS 1 flow channel
2 low pressure chamber
3 entering flow of a fluid that needs to be cleaned
4 cleaned fluid
5 outlet opening of the low pressure chamber
6 unit for generating an air flow in the flow channel 1
7 unit for generating low pressure
8 second discharging pump
10 outside openings
11 inlet opening for feeding ambient air into the tubular filter
12 inlet opening of the flow channel 1
14 outlet opening of the flow channel 1
15 outlet opening of the filtration unit
16 outlet opening for discharging suspended particles from the low pressure chamber 2
17 control unit
18 electric power supply unit
19 pressure sensor
20 inner openings
21 tubular filter
22 filtration unit
30 discharged flow from the low pressure chamber
31 first chamber
32 second chamber
33 third chamber
34 fourth chamber
35 fifth chamber
36 HEPA filter
37 discharged flow from the filtration unit 22
38 external module with inlet and outlet openings of the filtration unit 22
40 respiratory mask
41 face part of the respiratory mask
42 head holder of the respiratory mask
43 air pipe
44 connecting unit
45 fastening ring of the face part of the mask 40
46 recess in the connecting unit for fastening the head holder of the mask
48 recess in the connecting unit for fastening the air pipe
49 insert
50 magnetic element of the connecting unit
51 center of symmetry of the magnetic elements 50, 52
52 magnetic element of the fastening ring 45
53 magnets
54 direction of rotation of the connecting unit 44
55 element holding the mask 40
56 unit for fastening the air pipe 43 to the connecting unit 44
58 direction of rotation of the fastening element of the air pipe 43

The invention claimed is:

1. A tubular filter (21) for dynamic cleaning of an air flow containing suspended particles, comprising
at least one flow channel (1), which is curved in at least one portion, with a predetermined fixed or changeable radius of curvature,
a unit (6, 8) for generating the air flow in the flow channel (1), wherein
a low pressure chamber (2) having an outlet opening (5), wherein in the lower pressure chamber (2) the curved portion of the flow channel (1) is at least partially arranged and wherein a unit (7) for generating low pressure is connected to the outlet opening (5) of the low pressure chamber (2) for generating in the low pressure chamber (2) a pressure that is reduced with respect to the pressure of the flow in the flow channel (1),
wherein the unit (6, 8) for generating the air flow is configured to form Dean vortices at the curved portion of the flow channel (1), and
on the outer and inner parts of the curved portion of the flow channel (1) outer (10) respectively inner (20) openings for discharging the suspended particles from the flow channel (1) into the low pressure chamber (2) are formed.

2. The tubular filter (21) according to claim 1, wherein the diameter of the outer openings (10) is larger compared to the diameter of the inner openings (20).

3. A system for filtration of polluted ambient air, comprising
at least one filtration unit (22) comprising at least one tubular filter (21) according to claim 1, having
an inlet opening (11) for feeding ambient air into the tubular filter (21)
an outlet opening (15) of the filtration unit (22) for discharging cleaned air,
an outlet opening (16) for discharging suspended particles from a low pressure chamber (2),
a control unit (17) for controlled regulation of the unit (6) for generating an air flow in a flow channel (1),
an electric power supply unit (18).

4. The system for filtration according to claim 3, comprising a respirator mask (40) to be worn on the face of a user, comprising a face part (41) covering at least the nose and the mouth portion of the face of the user, and at least one air pipe (43) for feeding the air cleaned by the filtration unit (22) from the outlet opening (15) of the filtration unit (22) into the respiratory mask (40).

5. The system for filtration according to claim 3, comprising a unit (7) for generating low pressure in the low pressure chamber (2), wherein the control unit (17) is configured for controlled regulation of the unit (7) for generating low pressure and/or of the pressure of the cleaned air in the outlet opening (15) of the filtration unit (22).

6. The system for filtration according to claim 4, wherein the control unit (17) is configured to control the cycle and volume of the air fed into the tubular filter depending on the pressure of the cleaned air in the outlet opening (15) of the filtration unit (22), allowing due to a decrease of pressure in the mask (40) and the air pipe (43), respectively, in the outlet opening (15) of the filtration unit (22) when the user inhales and an increase of pressure when the user exhales, to control the operation of the unit (6) for generating an air flow in the tubular filter (21).

7. The system for filtration according to claim 4, wherein the control unit (17) is configured to maintain the pressure in the outlet opening (15) of the filtration unit (22), respectively, in the respiratory mask (40) for 0,01-20% above the atmospheric pressure during the time when the user inhales as well as the time when the user exhales, wherein the mask (40) is configured to release the air through an insert (49) between the face of the user and the face part (41), and/or through a gapping location between the face part (41) and the face of the user and/or through at least one opening and/or valve provided in the mask (40)

due to excess pressure generated inside the mask (40) by the air pipe (43).

8. The system for filtration according to claim 3, wherein at least one of the filtration units (22) comprises at least one of the additional chambers listed below, successively connected to an outlet opening (14) of the flow channel (1):

a first chamber (31) for depositing suspended particles of the flow not filtered by the flow channel (1) on the walls and/or on the bottom of the first chamber (31), a second chamber (32) containing HEPA or ULPA filters, a third chamber (33) for injecting aromatizing and/or medicinal substances into a flow of cleaned air flowing therein, a fourth chamber (34) for heating or cooling the air fed into the air pipe (43), a fifth chamber (35) for humidifying or drying the air fed into the air pipe (43).

9. The system for filtration according to claim 8, wherein the filtration unit (22) is arranged in a single housing, accommodating the tubular filter (21), the inlet opening (11) for feeding a flow of ambient air into the tubular filter (21), the outlet opening (15) of the filtration unit (22) for discharging cleaned air, the outlet opening (16) for discharging suspended particles from the low pressure chamber (2), the unit (7) for generating low pressure in the low pressure chamber (2), the additional chambers (31-35), the control unit (17), the electric power supply unit (18), or the inlet opening (11) for feeding a flow of ambient air into the tubular filter (21), the outlet opening (15) of the filtration unit (22) for discharging cleaned air, the outlet opening (16) for discharging suspended particles from the low pressure chamber (2) are arranged in a separate module (38) located at a distance from the single housing.

10. The system for filtration according to claim 3, wherein the spiral-shaped flow channel (1) is carried out with an inner diameter of from 1 mm to 30 mm and with an outer diameter of curvature of the channel in the direction of its central line of from 10 mm to 100mm, wherein the openings (10, 20) are made round or oval with the size of from 0,1 mm to 2 mm.

11. The system for filtration according to claim 8, wherein the first chamber (31) is connected with the outlet opening (14) of the flow channel (1) and is arranged for moving the air flow at least along one of its portions from the bottom upwards, being a gravitational filter thereby.

12. The system for filtration according to claim 4, wherein the face part (41) of the respiratory mask (40) is carried out in the form of a transparent visor, the edges of which basically repeat the adjacent contours of the face of the user.

13. The system for filtration according to claim 4, wherein on both sides of the mask (40) on each side is arranged one connecting unit (44) configured for stationary or detachable connection with each other of the face part (41) of the mask, a head holder (42) and the air pipe (43).

14. The system for filtration according to claim 4, wherein the mask (40) comprises the head holder (42) for fastening the mask on the face of the user.

15. The system for filtration according to claim 14, wherein the head holder (42) for the installation of the mask on the face of the user is carried out in the form of a bent ear holder arranged on the hind head of the user, or combined with at least one band covering the hind head and the parietal part of the head of the user.

16. The system for filtration according to claim 4, wherein the mask (40) is a full face mask with a holding element (55) arranged in the upper portion of the face part (41) of the mask and holding the mask (40) on the head of the user, the element (55) being configured for stationary or detachable connection with the air pipe (43), wherein the holding element (55) is carried out such that at least partially it is adjacent in shape to the parietal part of the head of the user.

17. The system for filtration according to claim 3, comprising at least one analyzer of the composition of the air fed into the tubular filter (21), the analyzer being configured for a qualitative and/or quantitative evaluation of organic and/or non-organic components contained in the air.

18. The system for filtration according to claim 3, configured to wash the filtration unit (22) by pumping through at least one of its chambers (2, 31-35) a washing and/or a disinfecting fluid and their subsequent drying.

19. The system for filtration according to claim 3, comprising a stationary base, configured for manual or automated cleaning of the filtration unit (22) by pumping through at least one of its chambers (2, 31-35) a washing and/or a disinfecting fluid and their subsequent drying, and/or charging the electric power supply unit (18).

20. The system for filtration according to claim 3, comprising an application for a mobile device acting as an interface for a control by the user and/or for displaying the functional parameters of the system for filtration.

* * * * *